United States Patent
Samdadiya et al.

(10) Patent No.: US 8,521,598 B1
(45) Date of Patent: *Aug. 27, 2013

(54) PLACEMENT IDENTIFICATION AND RESERVATION

(75) Inventors: Parag Samdadiya, Kirkland, WA (US); Rama Ranganath, San Francisco, CA (US); Joerg Heilig, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,456

(22) Filed: Sep. 14, 2012

Related U.S. Application Data

(63) Continuation of application No. 12/243,658, filed on Oct. 1, 2008, now Pat. No. 8,335,721.

(51) Int. Cl.
*G06Q 30/00* (2012.01)
(52) U.S. Cl.
USPC ....................................... 705/14.73
(58) Field of Classification Search
USPC ............................... 705/14, 14.73
See application file for complete search history.

(56) References Cited

U.S. PATENT DOCUMENTS

| | | | |
|---|---|---|---|
| 6,839,681 B1 | 1/2005 | Hotz | |
| 6,907,566 B1 | 6/2005 | McElfresh et al. | |
| 6,990,462 B1 | 1/2006 | Wilcox et al. | |
| 7,038,637 B1 | 5/2006 | Eller et al. | |
| 2002/0055880 A1 | 5/2002 | Unold et al. | |
| 2002/0072971 A1 | 6/2002 | DeBusk et al. | |
| 2004/0133469 A1 | 7/2004 | Chang | |
| 2004/0225562 A1 | 11/2004 | Turner | |
| 2005/0021403 A1 | 1/2005 | Ozer et al. | |
| 2007/0162379 A1 | 7/2007 | Skinner | |
| 2008/0103895 A1 | 5/2008 | Burdick et al. | |
| 2008/0195475 A1 | 8/2008 | Lambert et al. | |
| 2008/0313038 A1 | 12/2008 | Wajihuddin | |
| 2009/0319389 A1 | 12/2009 | Bapna et al. | |
| 2010/0082422 A1 | 4/2010 | Heilig et al. | |
| 2010/0082429 A1 | 4/2010 | Samdadiya et al. | |

FOREIGN PATENT DOCUMENTS

| | | | |
|---|---|---|---|
| JP | 20020099820 A | 4/2002 |
| KR | 2001102701 A | 11/2001 |

*Primary Examiner* — Naresh Vig
(74) *Attorney, Agent, or Firm* — Fish & Richardson P.C.

(57) ABSTRACT

A reservation system receives placement inventory data from publishers that define placements that the publishers are offering for reservation. Placement queries that include targeting criteria for advertisements are received from an advertiser. Available placements that satisfy the target query from the placements defined in the placement inventory data are identified as target placements. The advertiser can reserve the placements from the publisher, and modify the reservation during a reservation period. Advertisements belonging to a campaign of the advertiser can be provided to the publisher either by the advertiser directly in response to publisher requests to serve an advertisement for the reservation, or can be provided to the publisher by the reservation system or an advertising server in communication with the reservation system. Discrepancies of reported performance of advertisements in the placements reported by the advertisers and the publishers can be reconciled and attributed to either the advertiser or the publisher.

18 Claims, 8 Drawing Sheets

PLACEMENT IDENTIFICATION AND RESERVATION

CROSS-REFERENCE TO RELATED APPLICATIONS

This application is a continuation application of and claims priority to U.S. application Ser. No. 12/243,658, entitled "PLACEMENT IDENTIFICATION AND RESERVATION," filed on Oct. 1, 2008. The disclosure of the foregoing application is incorporated herein by reference in its entirety.

BACKGROUND

This document relates to advertisement placement management.

The Internet allows access to a wide variety of content items, e.g., video and/or audio files, web pages for particular subjects, news articles, etc. Such access to these content items has enabled opportunities for targeted advertising. In an online environment, advertisement targeting can be facilitated by presenting the advertisements in placements that reach a target audience. A placement can be any web property, e.g., a search engine results page, a website, a domain, or subset of web pages, etc., where an advertiser can place content items (e.g., advertisements). Placements can also be other forms of media property (e.g., print media, broadcast media, etc.) that can be used to publish a content item, such as an advertisement.

Advertisement syndication is a form of online advertising that allows advertisers to extend their marketing reach by distributing advertisements to additional partners for presentation in available placements. Through syndication, third party online publishers can place an advertiser's text or image advertisements in placements that have content related to the advertisement. As the users are likely interested in the particular content on the publisher webpage, they are also more likely to be interested in the product or service featured in the advertisement. Accordingly, such targeted placements can help drive online customers to the advertiser's website.

Placements on which to advertise can be selected by an advertiser based, in part, on placement traffic. For example, an advertiser may have traffic data for placements, provided by either the placement publishers or a third party, that specify traffic demographics, such as the location and age groups of users that view the placements. Thus, if an advertiser is interested primarily in advertising in a geographic region, such as California, the advertiser may select placements that receiving a significant portion of traffic from California. However, some of the publishers may enable targeting rules, i.e., rules that limit the types of advertisements presented depending on the demographic of a user visiting the placement. The use of these targeting rules can result in a much higher percentage of the advertiser's advertisements being provided to a target audience. For example, a first placement may receive 60% of its traffic from California, while a second placement may receive only 10% of its traffic from California. However, the second placement may have a targeting rule that enables the serving of an advertisement only if the placement is being viewed by a user in California. Thus, assuming the advertiser purchases 10,000 impressions, the first placement will, on average, result in 60% of the 10,000 impressions being shown in California. However, the second placement, which can target specifically to California, would result in all 10,000 impressions being shown in California. Thus, the better placement for the advertisement is the second placement, even though only 10% of its traffic is from the advertiser's target market.

Unfortunately, however, there is no easy way for the advertiser to collect such traffic data and target rule data from multiple publishers. Advertisers must contact publishers directly and request such information, which the publishers may or may not readily disclose. And even if the publishers do disclose this information, the process of finding placements and determining which placements are likely to result in the highest return on investment is time consuming, and often impossible to accomplish in a reasonable amount of time, if at all. Finally, the reservation of the placements can also be difficult process and subject to risk, as availability of the placements and pricing can vary, and publisher and advertising software and hardware may experience serving errors that cause discrepancies in the number of advertisements served for a placement.

SUMMARY

One aspect of the subject matter described in this specification can be embodied in a method of reserving placements. The method of reserving placements can include receiving placement inventory data from publishers, the placement inventory data defining placements that the publishers are offering for reservation through an online reservation system; receiving a placement query from an advertiser, the placement query including targeting criteria that defines target placements for the advertiser; identifying available placements from the placements defined in the placement inventory data, the available placements being the target placements that satisfy the placement query based on their placement inventory data and are available for reservation; providing reservation data for the available placements to the advertiser, the reservation data defining reservation requirements for each available placement; receiving acceptance data from the advertiser, the acceptance data identifying an accepted placement from among the available placements; providing the acceptance data to a publisher of the accepted placement; and reconciling advertisement performance of advertisements presented in the accepted placement during the reservation, the reconciliation being between the publisher of the accepted placement and the advertiser. Other embodiments of this aspect include corresponding systems, apparatus, and computer program products.

Another aspect of the subject matter described in this specification can be embodied in a method of ranking placements. The method of ranking placements can include receiving targeting criteria from an advertiser, the targeting criteria defining a target audience for an advertising campaign; identifying placements that reach users that satisfy the targeting criteria; and for each placement: determining a first precision for the placement, the first precision based on a first number of total users that are reached by the placement; identifying targeting rules enabled for the placement that satisfy at least a targeting criterion of the targeting criteria received from the advertiser; determining a second precision for the placement, the second precision based a second number of total users that are reached by the placement with the targeting rules enabled; ranking the placements based on the first precision and second precision of the placements; and presenting the placements to the advertiser according to the rank. Other embodiments of this aspect include corresponding systems, apparatus, and computer program products.

Particular embodiments of the subject matter described in this specification can be implemented so as to realize one or more of the following advantages. Advertisers can identify and reserve available placements that satisfy targeting criteria specified by the advertiser. Available placements can be ranked based on precision measures so that advertisers can identify more efficient placements for their advertisements. Placement reservation can be automated in a reservation system, thereby reducing errors that may occur. Financial transactions associated with the reservation can be facilitated by the reservation system. Advertisement performance measurements can be reconciled between advertisers and publishers to obtain a more accurate final performance measurement.

These various optional advantages and features can be separately realized and need not present in any particular embodiment. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

A reservation system facilitates reservation of placements between publishers and advertisers. The reservation system receives placement inventory data that describe the placements that the publishers are offering for reservation. Example placement inventory data for a placement includes a site uniform resource locator (URL), audience demographics and traffic data, a category or categories of the placement (e.g., "news" for a news site; "sports" for a sports site), reservation data specifying pricing and when the placements is available, and associated targeting rules for the placement. While most of the placement inventory data can be provided by the publisher, some placement inventory data, such as traffic data, can optionally be provided by other parties.

The reservation system indexes the placement inventory data for each placement so that advertisers can search placements by use of placement queries. A placement query includes targeting criteria from an advertiser that describes target placements on which the advertiser would like to place its advertisement. Based on the placement inventory data and the placement query, the reservation system identifies publishers and placements that can provide target placements that satisfy the advertiser's targeting criteria. The list of the available placements and corresponding prices for the available placements can be provided to the advertiser. Depending on the reservation system options, the advertiser can secure a reservation of a placement by selecting a placement from the list of placements, or can be provided contact information of a publisher so that the advertiser can directly contact the publisher to negotiate and secure a reservation of a placement.

In some implementations, the reservation system ranks the placements based on precisions, i.e., ratios of the number of target users reached by the placement to the total number of users reached by the placement. The placements are presented to the advertiser in the order of the rank so that the placements with the highest ratio of target users reached by the placement to the total number of users reached by the placement are presented first. These precisions can take into consideration whether the placement facilitates the use of targeting rules that enable the publisher of the placement to limit the serving of an advertisement on the placement to users that satisfy targeting criteria.

Throughout this document, placement reservation is described with relation to online advertising. However, the proposed methods for placement reservation can be implemented for content provided in other forms of media, for example, other forms of broadcast, multicast, print, radio or television media. Additionally, the proposed methods for item reservation can be used to reserve advertisement inventory, goods being auctioned in a single spot market auction or over a time period, commodities, as well as other items.

§2.0 Advertisement Publishing And Tracking

Figure 1:
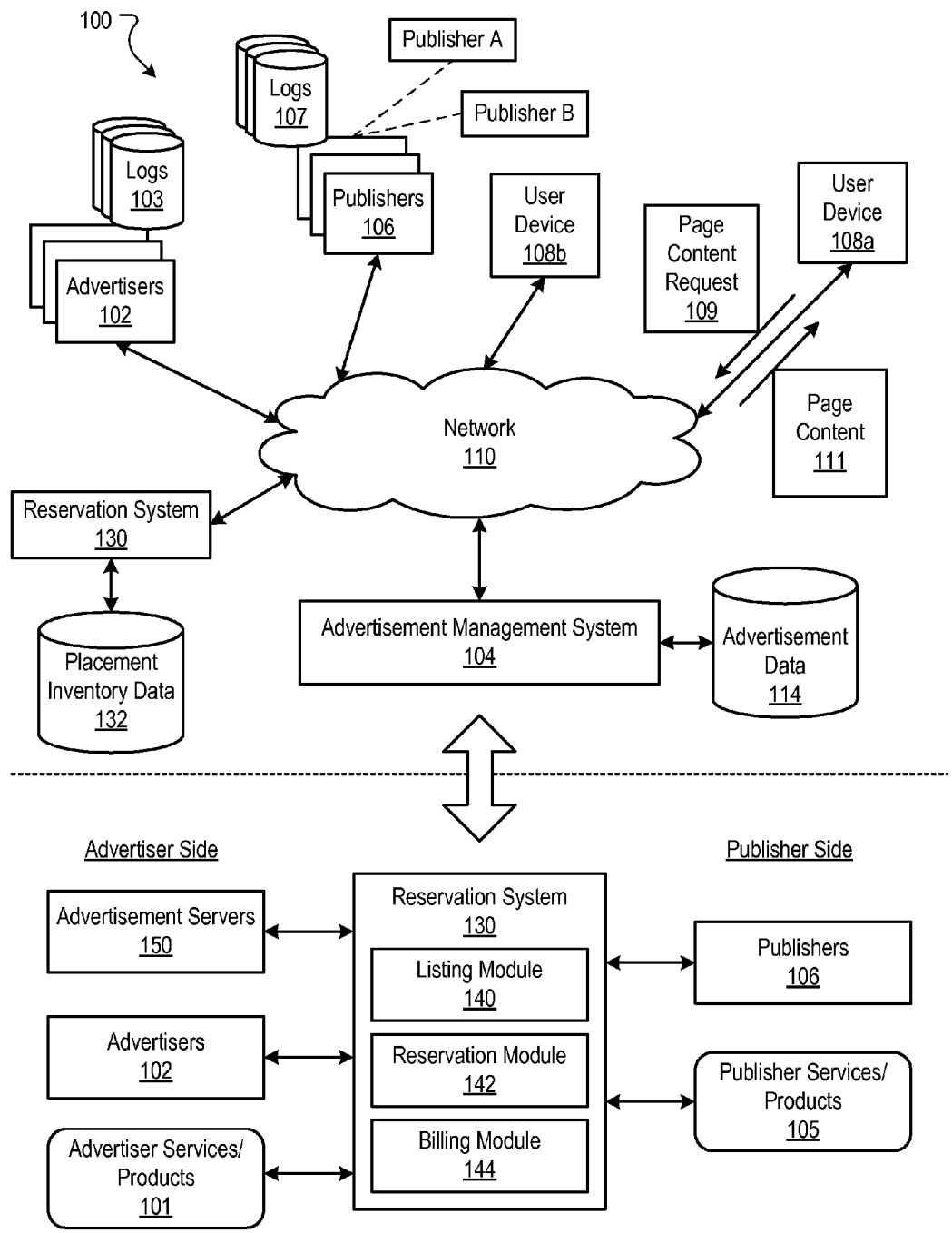
FIG. 1 is a block diagram of an example online environment in which an item reservation system can be implemented.

FIG. 1 is a block diagram of an example online environment 100 in which an item reservation system 130 can be implemented. The online environment 100 can facilitate the identification and reservation of placements and the serving of content items, e.g., web pages, advertisements, etc., to users. A network 110, such as a local area network (LAN), wide area network (WAN), the Internet, or a combination thereof, connects advertisers 102, an advertisement management system 104, publishers 106, user devices 108a and 108b, and a reservation system 130. The online environment 100 may include many thousands of advertisers 102, publishers 106 and user devices 108.

In some implementations, one or more advertisers 102 can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisements combining one of more of any of such components, etc., or any other type of electronic advertisement document. The advertisements may also include embedded information, such as links, meta-information, and/or machine executable instructions, such as HTML or JavaScript™.

A user device, such as user device 108a, can submit a page content request 109 to a publisher 106. In some implementations, the page content 111 can be provided to the user device 108a in response to the request 109. The page content 111 can include advertisements provided by the advertisement management system 104, or can include executable instructions, e.g., JavaScript™, that can be executed at the user device 108*a* to request advertisements from the advertisement management system 104. Example user devices 108 include personal computers, mobile communication devices, television set-top boxes, etc.

Advertisement requests can also be received from the publishers 106. For example, one or more publishers 106 can submit advertisement requests for one or more advertisements, e.g., creatives, such as several lines of text, a banner advertisement, an image advertisement, or a video advertisement, to the advertisement management system 104. The advertisement management system 104 responds by sending the advertisements to the requesting publisher 106 for presentation on one or more of the publisher's web properties (e.g., websites and other network-distributed content). The advertisements can include embedding links landing pages, e.g., pages on the advertisers' 102 websites, that a user is directed to when the user clicks an ad presented on a publisher website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the advertisement management system 104. This combined requested content and advertisements can be sent to the user device 108 that requested the content (e.g., user device 108*a*) as page content 111 for presentation in a viewer (e.g., a browser or other content display system). The publisher 106 can transmit information about the advertisements back to the advertisement management system 104 that describes how, when, and/or where the advertisements are to be rendered (e.g., in HTML or JavaScript™).

Publishers 106 can include general content servers that receive requests for content (e.g., articles, discussion threads, music, video, graphics, search results, web page listings, information feeds, etc.), and retrieve the requested content in response to the request. For example, content servers, related news content providers, retailers, independent blogs, social network sites, or any other entity that provides content over the network 110 can be a publisher.

The advertisers 102, user devices 108, and/or publishers 106 can also provide usage information to the advertisement management system 104 and/or reservation system 130. This usage information can include measured or observed user behavior related to advertisements that have been served, such as, for example, whether or not an impression, a conversion or a selection related to an advertisement has occurred. The usage information can also include traffic information, which includes user demographic information such as age, location, and gender, associated with a user device. The reservation system 130 performs financial transactions, such as crediting the publishers 106 and charging the advertisers 102 based on the usage information. Such usage information can also be processed to measure performance metrics, such as a number of impressions, a click-through-rate ("CTR"), conversion rate, etc.

An "impression" occurs, for example, each time that an advertisement is presented to a user. For example, in the online environment 100, an impression can occur each time the advertisement is presented on a user device 108. In a print advertising environment, an impression can correspond to each publication including the advertisement that is sold or otherwise distributed to readers. In the online environment, impressions can be tracked, for example, by advertisers 102 based on the number of times that the advertisement is successfully presented. Additionally, impressions can be tracked by publishers 108 based on the number of times that the advertisement is requested for presentation. In some situations, the number of impressions identified by the advertiser 102 can differ from the number of impressions identified by the publisher 106, as discussed below.

A click-through can occur, for example, when a user of a user device, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

A "conversion" occurs when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Other actions that constitute a conversion can also be used.

§3.0 Placement Reservation

In addition to an advertiser's advertisements being selected based on content such as a search query or web page content of a publisher, the advertiser can reserve a placement (e.g., advertisement slot) on a publisher's property to present its advertisement for a defined period. The defined period can be, for example, a defined time period, a defined number of impressions, a defined number of conversions, or any other definable period. During the reservation (i.e., defined period) the advertiser's advertisements can be presented in the reserved placement when the web property on which the reserved placement is located is presented on a user device 108.

Placement reservation can enable advertisers to reserve placements prior to serving time. The ability to reserve placements enables advertisers to hedge risks associated with participating in spot auction for the placement at the time of serving. For example, if an advertiser is required to participate in a spot auction for the placement, the advertiser is not assured to have its advertisement presented because the advertiser may not submit a bid high enough to secure the placement. In turn, the advertiser may miss an advertising opportunity if the advertiser is outbid.

To efficiently allocate the placements, a reservation system 130 can be coupled to advertisers 102, the advertisement management system 104, and publishers 106 through the network 110. In some implementations, the reservation system 130 can be implemented as a component of the advertisement management system 104. In other implementations, the reservation system 130 can be implemented separately from the advertising management system 130, and can also facilitate advertisement serving from other advertisement servers 150.

Various software architectures can be used to implement the reservation system 130. One example implementation includes a listing module 140, a reservation module 142, and a billing module 144. Other architectures and implementations can also be used.

The example reservation system 130 can have an advertiser facing side ("advertiser side") and a publisher facing side ("publisher side"). Advertisers 102 and advertisement servers 150 can directly access the reservation system 130 by use of client devices. In some implementations, advertisement services and/or products 101 that are offered to the advertisers 102 and advertisement servers 150 or the advertisement management system 104 can be configured to access the reservation system 130 to facilitate the provisioning of the functions and capabilities described below. Likewise, publishers 106 can directly access the reservation system 130 by use of client devices. Publisher services and/or products 105 that are offered to the publishers 106 can be configured to access the reservation system 130 to facilitate the provisioning of the functions and capabilities described below.

In the example implementation of FIG. 1, the listing module 140 allows publishers 106 to provide placement inventory data 132 to the reservation system 130, and also allows the advertisers 102 to submit targeting queries to identify and select placements. The reservation module 142 allows publishers and/or advertisement servers 150 to reserve placements from the publishers 106, and notifies the publishers 106 of such placement reservations. The billing module 144 manages billing, payment and performance reconciliation. These functions are described in more detail below.

§3.1 Placement Inventory Data

In some implementations, the reservation system 130 can receive placement inventory data 132 from the publishers 106 by use of the listing module 140, or some other application interface to the reservation system. The placement inventory data 132 defines the placements that can be reserved from the publisher 108. Example placement inventory data 132 for a placement includes a site uniform resource locator (URL), audience demographics and traffic data, a category or categories of the placement (e.g., "news" for a news site; "sports" for a sports site), reservation data specifying pricing and when the placements is available, and associated targeting rules for the placement. For example, one of the publishers 106, "publisher A," may provide placement inventory data 132 to the reservation system 130 indicating that publisher A has a placement available for reservation on a news web page that reaches (e.g., is presented to) one million users in California and five hundred thousand users in Georgia each day. Publisher A may also provide placement inventory data 132 indicating that it has another placement available for reservation on a social networking web page that reaches five million users in New York and one million users in Florida each day. Similarly, another one of the publishers 106, "publisher B" may provide placement inventory data 132 to the reservation system 130 indicating that publisher B has a placement available for reservation on a news web page that reaches one million users New York and one million users in California.

The reservation system 130 uses the received placement inventory data 132 to create an association of placements and publishers. These associations can be maintained, for example, in an association table. For example, the reservation system 130 can receive the placement inventory data 132 from publisher A and publisher B above and, in turn, create associations between the publishers and their placements and maintain the associations in a table similar to that provided in Table 1.

TABLE 1

| Placement Inventory Table | Web Page Content Category: | | Geographic Reach Category: | | | |
|---|---|---|---|---|---|---|
| Publisher: | News | Social Networking | Florida | California | New York | Georgia |
| Publisher A | URL1 | | | 1,000,000 | | 500,000 |
| Publisher A | | ULR2 | 1,000,000 | | 5,000,000 | |
| Publisher B | URL3 | | | 1,000,000 | 1,000,000 | |

The list of associations in Table 1 is not exhaustive. For example, in addition to URLs of particular placements, advertising slots for each URL can be specified, and traffic figures can be broken down by particular user demographics, such as age and gender.

Not all of the placement inventory data 132 shown in Table 1 need be provided by the publishers. For example, a publisher can provide only a URL, and the reservation system 130 can crawl the URL to determine the number of slots available, and can also process traffic statistics that are monitored by the reservation system 130 or received from a third party to infer demographic data.

The placement categories can be predefined in the reservation system 130 or created by the reservation system 130, for example, in response to placement inventory data 132 received from the publishers. When the categories are predefined, the reservation system 130 can identify placement inventory data 132 that corresponds to the predefined categories. When the reservation system 130 defines the categories in response to the categories being in the placement inventory data 132, the reservation system 130 can define a new category based on the placement inventory data 132 received from the publishers. For example, if the reservation system 130 receives a sufficiently high number of instances of a particular placement inventory datum type (e.g., "blog"), the system 130 can create a category for "blog" and create associations based on this criteria category.

In some implementations, the reservation system 130 may require a minimum number of users (e.g., 10,000) be reached in a particular geographic region for the publisher to be associated with a geographic reach category in the association table that corresponds to the geographic region.

In some implementations, publishers can provide placement inventory data 132 by submitting or selecting the category criteria that the publisher's placements satisfy. For example, the reservation system 130 can provide the publisher a graphical user interface in which category drop down menus or check boxes can be provided for the publisher to select the categories that the publisher's placements satisfy. In turn, the reservation system 130 can use the selections to populate the appropriate categories in the association table with the publisher's identity.

Figure 2A:
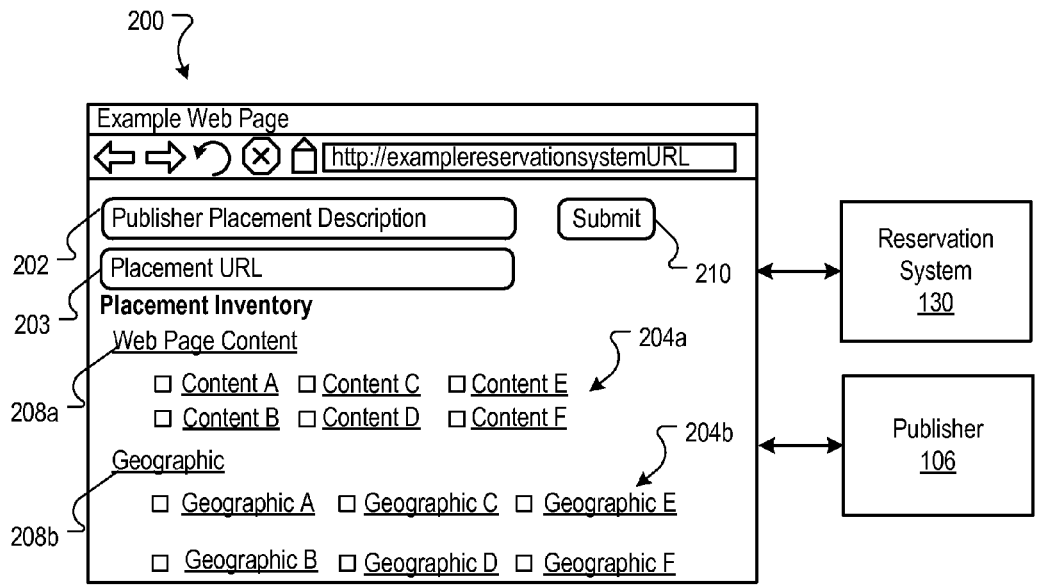
FIG. 2A is an example reservation system user interface that can be provided to a publisher to input placement inventory data.

FIG. 2A is an example reservation system user interface 200 that can be provided to a publisher to input placement inventory data 132. A data entry field 202 allows a publisher to enter text that describes a placement. The text entered by the publisher can be unrestricted or can be a list of terms that can be recognized as placement inventory data by the reservation system 130. For example, publisher A can enter the text "News, California, Georgia" in the data entry field 202 to describe its first placement. In turn, the reservation system 130 can search the association table for placement inventory data 132 categories that corresponds to the entered text and create associations for that placement.

In some implementations, a publisher 106 can provide a uniform resource locator for the placement in a URL entry field 203. In turn, the reservation system 130 can identify placement inventory data 132 from the web page. For example, the reservation system 130 can examine the web page and determine that the web page contains news content. Similarly, the reservation system 130 can identify usage statistics for the web page to determine an amount of user traffic that that web page experiences as well as the geography of the users that visit the web page. The usage statistics (e.g., page hits, click-throughs, user demographics, etc.) can be identified, for example, from a web traffic monitoring service. Based on this information, the reservation system 130 can associate publisher B with the appropriate placement inventory data 132 categories in the association table.

The user interface 200 can also input placement inventory data 132 by use of categories 204a and 204b that can be selected by a publisher to define the publisher's placements. For example, the user interface 200 can include check boxes 206 that a publisher can click to select each placement category with which its placements are associated. The placement categories 204a and 204b can also be grouped according to the placement categories 208a and 208b to which it belongs. For example, each category 204a that is included in the association table can be grouped under the "Web Page Content" category 208a, which includes various types of content (e.g., news, sports, entertainment, etc.). Similarly, each geographic category 204b that is included in the association table can be grouped under the "Geographic" placement category 208b, which includes various geographic regions (e.g., California, Georgia, United States, etc.). Other placement categories can also be used, including audience demographics.

Once a publisher 106 has entered information in the user interface 200, the publisher 106 can click a submit button 210. Upon clicking the submit button 210, the placement inventory data 132 provided by the publisher 106 can be received by the reservation system 130. In turn, the reservation system 130 can associate the publisher 106 and its placement with the placement inventory data 132.

In some implementations, a publisher 106 can specify, for each entered placement inventory datum, whether a targeting rule for that datum is enabled. Targeting rules allow the publishers to present advertisements for the placement based on criteria associated with a page request. For example, a publisher can have a targeting rule that enables the presentation of specific advertisements for traffic originating from California, and the presentation of other advertisements for traffic originating from outside of California. Accordingly, an advertiser that desires to present advertisements to users in California can take advantage of the targeting rule enabled by the publisher.

Targeting rules for publishers can be collected in other ways as well. For example, the reservation system 130 can determine whether a publisher has corresponding targeting rules enabled by examining data received from the publisher or from a third party that break down traffic according to various targeting rules.

The example user interface 200 is illustrative only, and additional and/or other user interfaces and processes can also be used to facilitate the collection of placement inventory data 132 from publishers.

§3.2 Placement Queries

The reservation system 130 can receive placement queries from advertisers 102 that can include targeting criteria that define target placements. The placement queries can be processed by the listing module 140, or by some other application interface. Target placements are placements that the advertiser is targeting for presentation of its advertisement. For example, an advertiser 102 may target placements that are presented on news web pages that reach males between eighteen and twenty-five located in Florida. Therefore, the advertiser 102 may provide a placement query including the targeting criteria "news," "males," "eighteen to twenty-five," and "Florida" to identify target placements for its advertisement.

Figure 2B:
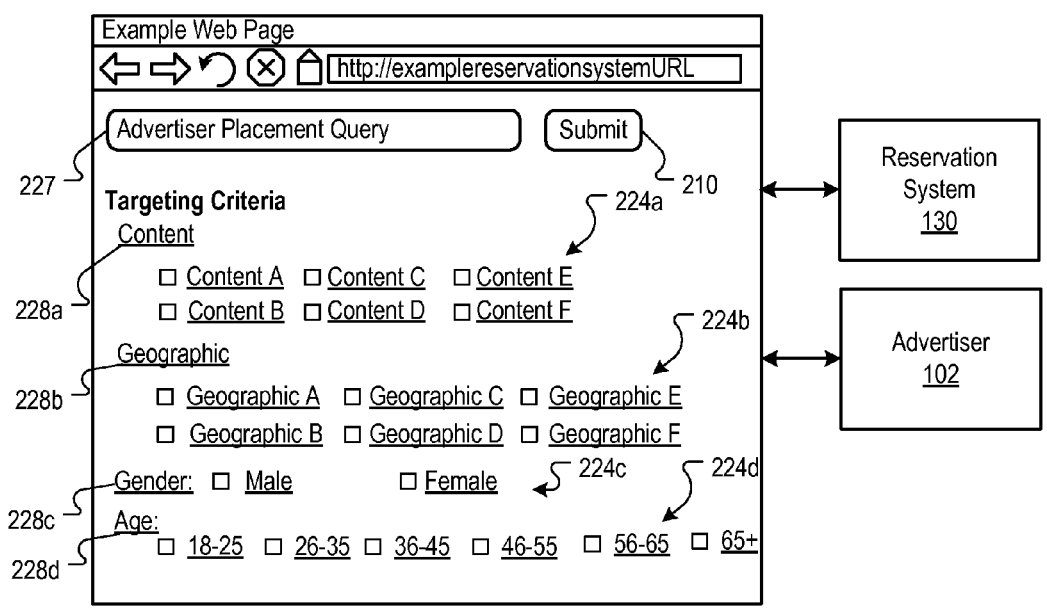
FIG. 2B is an example reservation system user interface that can be provided to an advertiser to input a placement query.

The reservation system 130 can receive the placement query, for example, through a user interface that is provided to the advertiser 102. FIG. 2B is an example reservation system user interface 220 that can be provided to an advertiser 102 to input a placement query. In some implementations, the user interface 220 can include a data entry field 222. The data entry field 222 can be a field in which an advertiser 102 can enter text defining a placement query. The text defining the placement query can be unrestricted, or the advertiser 102 can be provided a list of terms that can be recognized as targeting criteria by the reservation system 130. For example, the advertiser 102 can enter the text "news males Florida" into the data entry field. In turn, the placement criteria in the placement query can be identified by the reservation system 130 and used to identify target placements.

In some implementations, the user interface 220 can provide targeting criteria 224a-224d that can be selected by an advertiser to define the advertiser's target placements. For example, the user interface 220 can include check boxes 226 that an advertiser can click to select each targeting criterion that defines its target placement. The targeting criteria 224a-224d can be grouped in the user interface according to a targeting criteria category 228a-228d to which it belongs.

Once an advertiser 102 has entered a placement query in the user interface 220, the advertiser 102 can click a submit button 210. Upon clicking the submit button 210, the placement query provided by the advertiser 102 is received by the reservation system 130. In turn, the reservation system 130 can use the targeting criteria to identify target placements for the advertiser 102. The target placements are placements that have associated placement inventory data 132 that satisfy the targeting criteria.

§3.3 Placement Identification and Selection

The reservation system 130 can use the placement inventory data 132 in the association table and the targeting criteria provided by advertisers to identify publishers 106 and target placements available for reservation (i.e., placements that satisfy the advertiser's targeting criteria as specified by the query). The reservation system can identify the publishers 106 and target placements by determining whether the publishers 106 are associated with placement inventory that satisfy the advertiser's targeting criteria. For example, if an advertiser 102 provides targeting criteria "News and California" and "News and New York," the reservation system 130 can access the association table of Table 1 to identify publishers that are associated with the placement inventory data of "News" and "California" or "News" and "New York." According to the example association table of Table 1, publishers A and B have placements (URL1 and URL3, respectively) that satisfy these targeting criteria. The reservation system 130 identifies available placements (e.g., target placements that are available for reservation) for the advertiser 102. For example, the placements of Publishers A and B, located at URL1 and URL3 respectively, are identified to the advertiser.

In some implementations, the advertiser can examine the placements, such as an advertising purchaser reviewing the placements on a web browser, and purchase a reservation according to pricing data specified in reservation data provided by the publishers. The reservation data can be provided as part of the placement inventory data, and can include, for example, the availability of the placement (e.g., time, day, etc.), the number of impressions the placement can provide and the price of the placement. Example reservation data that is provided to an advertiser is shown if Table 2 below.

TABLE 2

|  | Available Placement | Price | Impressions/ Week | Availability |
| --- | --- | --- | --- | --- |
| Publisher A | Yes | $0.012/impression | 1,200,000 | August 10-30 |
| Publisher B | Yes | $0.010/impression | 1,000,000 | August 12-29 |

Often a publisher may not offer placements for automatic reservation at the advertisers' option, and may prefer to negotiate directly with the advertisers. Thus, in some implementations, the reservation system 130 can provide each of the identified publishers with the targeting criteria and their respective target placements that satisfy the targeting criteria and request that the publishers provide reservation data for available placements to the advertisers. In some implementations, the reservation system 130 can allow publishers 106 to provide contact information to the advertiser 102 so that the advertiser 102 and publisher 106 can communicate directly regarding the transaction. Upon an agreement being reached between the publisher 106 and the advertiser 102, the publisher 106 can update its associated placement inventory data to reflect the reservation.

Figure 2C:
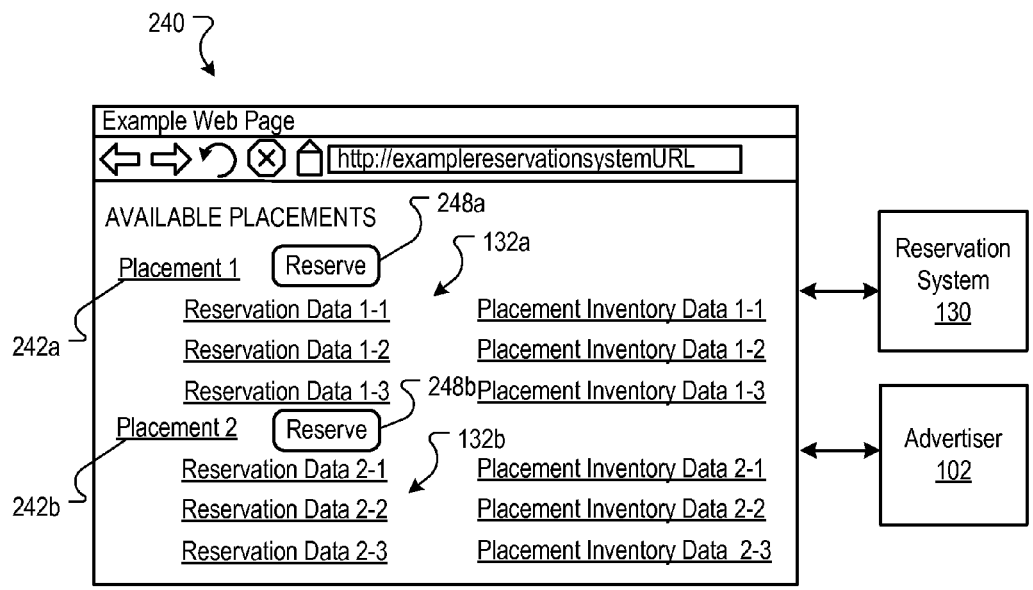
FIG. 2C is an example reservation system user interface that can be provided to an advertiser to receive acceptance data.

FIG. 2C is an example reservation system user interface 240 that can be provided to present available placements to an advertiser 102. In some implementations, the user interface 204 can provide the advertiser 102 with a description 242 of each available placement. For example, the reservation system 130 can provide the title of the web page on which the placement is presented (e.g., "Placement 1"). For each available placement, the user interface 240 can also provide the advertiser with placement inventory data 132 (optionally including reservation data). The placement inventory data 132 can include all of the placement inventory data 132 provided by the publisher 106 or be restricted to the placement inventory data 132 that satisfy the advertiser's targeting criteria.

In some implementations, the advertiser 102 can select an available placement by providing acceptance data to the reservation system 130. The acceptance data can be provided, for example, by clicking a reserve button 248a or 248b for a respective placement 242a or 242b, and can be processed by the reservation module 142.

An actual reservation can be secured in a number of different ways by use of the reservation system 130, including automatic acceptance or through negotiations with the publisher. For automatic acceptance, the acceptance data can identify the available placement selected by the advertiser 102, the price of the available placement, data defining the reservation period and acknowledging acceptance of the terms and conditions of the publisher to consummate a purchase. Such terms and conditions can include the type of advertisements that can be presented, e.g., image formatting requirements, content restrictions, etc., and limitations on performance and pricing requirements.

The publisher 106 is then provided a notification of the reserved placement, and placement inventory data 132 associated with the publisher is updated. For example, if 20,000 impressions were available for reservation and the advertiser reserved 10,000 impressions, the publisher 106 is notified of the reservation and the number of impression available for reservation at the publisher's placement is reduced to 10,000.

For negotiated acceptance, the reservation system 130 receives the acceptance data and, in turn, provides the acceptance data to the publisher 106. Upon receipt of the acceptance data, the publisher 106 can allocate the accepted placement to the advertiser 102 for the defined reservation period, or can negotiate with the advertiser 106. In some implementations, the publisher 106 can provide confirmation data to the reservation system 130 that confirms the reservation and the terms of the transaction. In turn, the reservation system 130 can provide the confirmation to the advertiser 102 informing the advertiser 102 that the reservation has been confirmed, and can update the placement inventory data 132 of the publisher 106.

Other ways of facilitate offer and acceptance of reservations by use of the reservation system 130 can also be used.

The advertiser 102 can provide advertisement identifiers of advertisements to be presented on the placement and targeting criteria associated with the advertisement identifiers, subject to the terms and conditions of the placement. For example, the placement inventory data 132 may define a placement that can present advertisements with no more than three lines of text and an image of no more than 256×256 pixels. The advertiser 102 can provide, as part of the acceptance data, advertisement identifiers, scripts that can be executed to request the advertisement from an advertisement server, and other data, such as targeting criteria, to the publisher 106. The publisher 106 can then use this advertising data for presenting the advertisements in the placement for the duration of the reservation.

§4.0 Placement Ranking

In some implementations, the order in which the reservation system 130 presents placements to advertisers can be determined based on a precision (e.g., efficiency) with which the placements satisfy the targeting criteria. This determination can be made by the listing module 140, for example. A placement can reach users that satisfy the targeting criteria as well as users that do not satisfy the targeting criteria. For example, an advertiser 102 that desires to advertise in California advertises on a web site having a placement that receives 60% of its traffic from California. Absent any targeting rules, only 60% of the impressions purchased by the advertiser will reach its target audience in California.

An advertiser 102 prefers to place its advertisement in a placement that reaches a higher percentage of users that satisfy the advertiser's targeting criteria, thereby increasing the efficiency of the advertising. The reservation system 130 determines a first precision for each available placement and presents the placements to the advertiser 102 based on the precisions.

The first precision is calculated without consideration of targeting rules. However, publishers 106 can enable targeting rules that facilitate selective presentation of advertisements to users that satisfy targeting criteria of the advertiser 102. Targeting rules can increase the precision of a placement for advertisers 102 that have specified targeting criteria that correspond to the targeting rules enabled for the placement. Thus, the reservation system 130 determines a second precision for each placement with the targeting rules enabled. The placements are then presented to the advertiser based on the first and second precisions.

§4.1 Placement Precision without Targeting Rules Enabled

The reservation system 130 determines a first precision for each available presentation without considering the effects of targeting rules. The first precision of each placement can be determined, for example, based on the first total number of users reached (e.g., a total number of users reached without targeting rules enabled) by the placement that satisfy the targeting criteria. For example, an advertiser 102 provides targeting criteria to the reservation system 130 that defines target placements as placements that reach users that are between the ages eighteen and twenty-five and live in California. In response to a request from the reservation system 130, two publishers provide reservation data identifying available placements X and Y for the advertiser 102.

The reservation system 130 can examine usage data from the placement inventory data 132 (e.g., web traffic data received from a web traffic data service or the publisher and stored in the placement inventory data) for each of the placements to identify the first total number of users that are reached by each placement as well as the number of targeted users that satisfy the targeting criteria specified by the advertiser and that are reached by the placement. Example usage data for two placements X and Y are provide in Table 3.

TABLE 3

|  | Total Users Reached/day | California Users Reached/day | Users between 18-25 Reached/day | California Users 18-25 Reached/day |
| --- | --- | --- | --- | --- |
| Placement X | 10,000,000 | 1,500,000 | 6,000,000 | 1,000,000 |
| Placement Y | 10,000 | 7,000 | 8,000 | 6,000 |

Based on the example usage data in Table 3, the reservation system 130 can determine that placement X has a precision of 0.1 (e.g., 1,000,000/10,000,000) and placement Y has a precision of 0.6 (e.g., 6,000/10,000). These first precisions indicate that 1 out of every 10 users reached by placement X satisfy the advertiser's targeting criteria, and 6 out of every 10 users reached by placement Y satisfy the targeting criteria. Based only on these first precisions, advertiser 102 will increase the efficiency of its advertising by placing its advertisements on placement Y, rather than placement X. Accordingly, the reservation system 130 can rank and present placements to the advertisers based on the first precision, for example, can present placement Y to the advertiser first followed by placement X, so that more efficient placements are presented to the advertiser 102 before less efficient placements.

§4.2 Placement Precision with Targeting Rules

When targeting rules are enabled for placements, the ranking of the placements can be further adjusted based on second precisions. The targeting rules can, for example, limit presentation of advertisements placements to users that satisfy the targeting rules. For example, the reservation system 130 can identify targeting rules enabled by publishers 106 that limit presentation of advertisements for placements based on geographic location of users, user demographics, or other characteristics related to users.

The reservation system 130 determines whether the targeting criteria received from an advertiser 102 corresponds to a targeting rule. For example, the targeting criteria "California" can be mapped to a geographic targeting rule for placements by the reservation system 130. Similarly, if a demographic targeting rule has been defined for placements, then the 18-25 targeting criteria can be mapped to the demographic targeting rule.

A list of the targeting rules that are enabled for a placement can be included in the placement inventory data 132 that is provided by publishers 106. For example, the placement inventory data provided for placement X can include data indicating that only geographic targeting has been enabled. Therefore, presentation of advertisements in placement X can be restricted based on the geographic location of the user requesting the web page on which placement X is presented. However, the placement inventory data 132 does not include data indicating that demographic targeting has been enabled for placement X, and thus the presentation of advertisements in placement X will not be restricted based on the demographics of the users, even though an advertiser's targeting criteria includes a demographics target.

For each placement that has enabled the mapped targeting rules, the reservation system 130 can determine a second number of total users that are reached by the targeted advertisement on the placement with the mapped targeting rules enabled. For example, as discussed above, placement X has enabled a geographic targeting rule, and has not enabled a demographic targeting rule. Therefore, the advertiser's targeting criteria "California," which is mapped to the geographic targeting rule, can restrict the presentation of advertisements for placement X to users that are located in California. Accordingly, based on the data provided in Table 3, the second total number of users reached by the targeted advertisement on placement X with the geographic targeting rule enabled will be 1,500,000 (e.g., the number of California users reached per day). If placement Y does not enable targeting rules, its first total number of users reached by placement Y will remain unchanged, and the reservation system 130 can continue without determining a second total number of users for placement Y.

The reservation system 130 also determines the number of targeted users that satisfy the targeting criteria and reached by the advertisement on the placement with the targeting rules enabled. Based on the data in Table 3, this number is 1,000, 000. The second precision can be a ratio of the targeted users reached relative to the total number of users reached with the targeting rules enabled. Thus, based on the data in Table 3, placement X will have a second precision of 0.667 (e.g., 1,000,000/1,500,000). Therefore, two-thirds of users reached by advertisements on placement X with targeting rules enabled satisfy the advertiser's targeting criteria.

The reservation system 130 ranks the available placements based on the first and second precisions. In some implementations, the reservation system 130 can rank placements that have not enabled targeting rules based on the first precision, and can use the greater of the first and second precisions to rank a placement that has enabled targeting rules. For example, the reservation system 130 can rank placement Y based on its first precision of 0.6 because placement Y has not enabled targeting rules. Additionally, the reservation system 130 can rank placement X based on the second precision of 0.667 because the second precision is greater than the first precision (e.g., 0.1). Accordingly, the reservation system 130 can rank placement X first and placement Y second based on the precisions. Thus, placement X's rank has increased by the enabled targeting rules.

Note that had placement X has only a targeting rule for age enabled, the second precision would be 0.167 (i.e., 1,000,000/6,000,000); and if placement X has both geographic and age targeting rules enable, the second precision is 1.00 (i.e., 1,000,000/1,000,000).

Figure 2D:
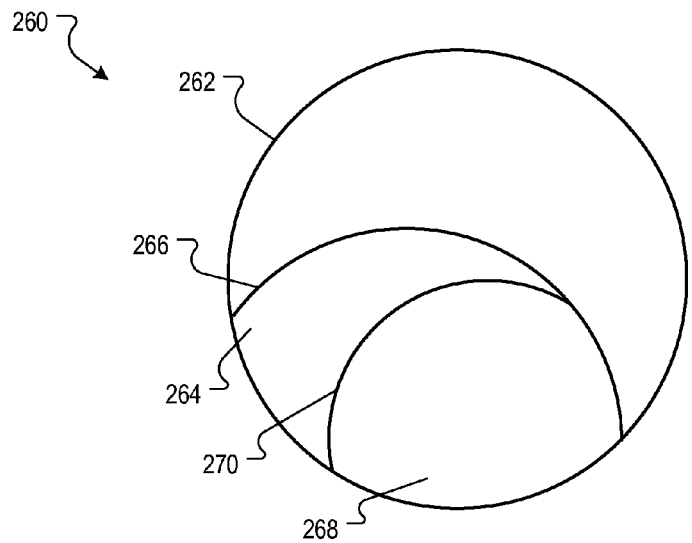
FIG. 2D is a Venn diagram of an example set and example subsets of users reached by a placement.

FIG. 2D is a Venn diagram 260 of an example set and example subsets of users reached by a placement. The circle 262 represents a user set (e.g., first total number of users) reached by a placement without regard to targeting rules, e.g., 10,000,000 total users. The area 264 of the circle 262 enclosed by a first arc 266 (and inclusive of the area 268) represents a proper subset (e.g., second total number of users) of the user set reached by the placement according to a first targeting rule enabled, e.g., 1,500,000 total users reached by placement X with the geographic targeting rule enabled. The area 268 enclosed by a second arc 270 represents a proper subset of users that satisfy the advertiser's targeting criteria that are reached by the placement. For example, the area 268 represents the 1,000,000 targeted users that satisfy the advertiser's targeting criteria (e.g., California users between 18-25) that are reached by placement X. Thus, as shown by the Venn diagram 260, the number of total users reached by a targeted advertisement decreases when targeting rules are enable, and of those numbers reached, a higher percentage satisfy the targeting criteria, thereby increasing the precision of the placement. Note that if all the targeting criteria are mapped to enabled targeting rules, then the second precision would be 100%.

As demonstrated by the example above, a publisher can increase the rank and, in turn, the presentation position of its placements by enabling targeting rules because targeting rules can increase the precision of the targeting that can be realized with the placement.

§5.0 Advertisement Exchange and Performance Tracking

Once a reservation is created, the publisher 106 can present an advertisement for the advertiser 102 in the placement during the reservation period. In some implementations, the reservation system 130 can facilitate advertisement exchange between the advertiser 102 and the publisher 106. For example, once a reservation is created, the reservation system 130 can prompt the advertiser 102 to upload, or otherwise provide, advertisements that will be, in turn, provided to the publisher 106. The advertisements can, in some implementations, be a group of advertisements belonging to an advertising campaign, each of which will be selectively presented during the reservation period.

The reservation system 130 can provide the advertisement to the publisher 106, for example, through the network 110. The publisher 106 can store the advertisement in a data store and retrieve the advertisement from the data store each time the advertisement is to be presented. For example, in some situations, an advertisement management system 104 can be authorized by a publisher 106 to provide the publishers' placements for allocation by the reservation system 130. In these situations, the advertisement management system 104 can receive an advertisement from an advertiser 102 and, in turn, store the advertisement in an advertisement data store 114. Each time that the advertisement is selected for presentation in the placement, the advertisement management system 104 can retrieve the advertisement from the advertisement data store 114.

In some implementations, the advertiser 102 can provide a location from which the advertisement can be served (e.g., advertisement server) rather than providing a file containing the advertisement. The reservation system 130 can receive, for example, a URL from the advertiser 102 and provide the URL to the publisher 106. In turn, the publisher 106 can retrieve the advertisement from the URL each time that the advertisement is selected for presentation in the placement. An advertiser 102 may provide a URL so that the advertiser's advertisement can be provided, for example, by an advertisement management system 104 or other advertisement server. This enables the advertisement management server 104 to track the performance of the advertisement during the reservation period and provide a performance measurement for the advertisement to the advertiser.

The advertiser 102 can optionally monitor the performance of the advertisements during the reservation period and, if the publisher 106 has acquiesced to such flexibility, the advertiser 102 can modify its reservation order. For example, an advertiser may purchase a reservation of 2,000 impressions from a publisher, and the reservations are to be delivered over a 1 week period. If the advertiser 102 finds that advertisements for those placements are performing well, e.g., have high click thorough rates or conversions, the advertiser 102 can extend the reservation if additional placement inventory is available from the publisher. Such extension can include purchasing additional impressions and/or extending a time period of the reservation.

In some implementations, the advertiser 102 can optionally specify a minimum performance expectation and/or the publisher 106 can provided a minimum performance expectation, e.g., a minimum click-through rate. If the minimum performance expectation is not being met, then the advertiser 102 can cancel the remaining reservation.

The final price that an advertiser 102 pays for a reservation can be based on a performance measurement (e.g., impressions) of the advertisement in the placement during the reservation period. Therefore, the advertiser 102 and the publisher 106 may both measure the performance of the advertisement in order to determine the final price that should be charged for the reservation. However, the performance measurement that is measured by the advertiser 102 may differ from the performance measurement that is measured by the publisher 106.

For example, when a publisher 106 requests an advertisement from the URL provided by the advertiser 102, the publisher 106 may increment the number of impressions for the advertisement. However, if the advertisement is not served (e.g., a server error, URL error, etc.) the advertiser 102 may not increment the number of impressions for the advertisement. Therefore, a discrepancy can exist between the final performance measurements and, in turn, reservation prices that are calculated by the publisher 106 and the advertiser 102.

In some implementations, the reservation system 130 can reconcile discrepancies between the performance measures of advertisers 102 and publishers 106. The reconciliation can be performed by the billing module 144. In some implementations, discrepancies are resolved based on reported performance measurements received from the advertisers 102 and publishers 106. In other implementations, the discrepancies are resolved based on performance logs 103 and 107 received from the advertisers 102 and publishers 106, or otherwise accessed by the reservations system 130.

§5.1 Reconciliation Based on Reported Performance Measures

In some implementations, the reservation system 130 can resolve discrepancies based on reported performance measurements received from the advertisers 102 and publishers 106. For a reservation between an advertiser 102 and a publisher 106, the reservation system 130 receives a number of reported impressions from each of the advertiser 102 and the publisher 106. If the number of reported impressions do not match, a reconciliation can be determined based on an attributed risk of loss and, optionally, a risk threshold.

For example, the risk of loss for any discrepancy below the risk threshold can, in some implementations, be attributed to the publisher. To illustrate, assume an advertiser reserves 2,000 impressions from a publisher. After the publisher reports 2,000 impressions, the reservation system 130 can request from the advertiser the reported number of impressions the advertiser has recorded. Assuming the advertiser reports 1,900 impressions, the advertiser is only charged for 1,900 impressions.

The reservation period can be determined to expire when the publisher reports a number of reported impressions that satisfies the reservation obligation. As the publisher must be able to manager its impression inventory, the obligation of the reservation period being determined based on the publisher's reported impression number is generally preferred over the obligation of the reservation period being determined based on the advertiser's reported impression number. The interest of the advertiser is protected in that the advertiser is only charged for the impressions it reports within the risk threshold.

In some implementations, the reservation system 130 can instruct servers of the advertisers 102 and the publishers 106 to report impression numbers periodically instead of at the end of a reservation period. For example, impression numbers can be sent to the reservation system 103 every hour, or every day, or some other partial period of the reservation period. For each set of reported numbers, the reservation system 130 determines if the reported discrepancy is within a risk threshold, e.g., 10%. If the reported discrepancy is within the risk threshold, processing can proceed normally. Otherwise, the reservation system 130 can notify the publisher 106 and the advertiser 102 of the risk threshold being exceeded so that the publisher 106 and the advertiser 102 can investigate the cause of the discrepancy.

The risk of loss, risk thresholds, and monitoring periods can each be adjusted, dependent on advertiser and publisher negotiations. For example, the risk of loss can be shifted to the advertiser with a 5% risk threshold, if both the advertiser and publisher agree.

§5.2 Reconciliation Based on Performance Measures Determined from Performance Logs In some implementations, the reservation system 130 resolves discrepancies based on performance logs 103 and 107 received from the advertisers 102 and publishers 106, or otherwise accessed by the reservations system 130. The reservation system 130 can receive the performance measurements from the advertisers 102 and the publishers 106 from corresponding logs 103 and 107 that store performance data (e.g., impressions served, click-throughs, conversions, etc.) defining one or more performance measurements. These performance measures can be aggregated by the reservation system 130 to determine performance measures similar to the performance measures described in §5.1 above. If the performance measurements are equal, the reservation system 130 can provide a performance confirmation to the advertiser 102 and the publisher 106 indicating that both parties reported the same performance measurement. However, if there is a discrepancy, the reservation system 130 can examine logs of the advertiser 102 and the publisher 106 to identify, for example, instances where the advertisement was not properly presented in the placement or a performance measurement was not counted correctly.

For example, the reservation system 130 can identify whether the advertisement was actually presented in response to the publisher's request for the advertisement, e.g., by examining the advertiser's log for a record of the advertisement being served. If the advertisement was not presented, the reservation system 130 can determine, for example, whether the publisher 106 requested the advertisement from the correct URL, and if not, whether a publisher error or an advertiser error was the cause. Similarly, if the publisher 106 requested the advertisement from the correct URL, the reservation system 130 can determine whether an advertiser server error or a publisher server error may have prevented the advertisement from being presented. Based on the cause of the error, the reservation system 130 can determine whether the advertiser 102 should be charged for an impression. Once the reconciliation has been completed, the final price of the reservation can be computed based on the reconciled performance measurement.

Many processing errors can occur that result in a discrepancy, and the errors can be determined from the logs 103 and 107 and attributed to the publisher or advertiser in a variety of ways. For example, a request error in the publisher log 107 may indicate a request time-out for an advertisement request. The advertisement request can be inspected to check if the request was properly sent, i.e., included the correct address and request parameters. If the request was improperly sent, then the cause of the error is determined and attributed to either the publisher or the advertiser. For example, if the cause of the error is attributed to a publisher server malfunction, e.g., a base64 encoding error that occurred when sending the request, the error is attributed to the publisher. Conversely, if the cause of the error is attributed to an incorrect script that was provided by the advertiser, then the error is attributed to the advertiser.

A performance measurement for the reservation (e.g., an impression, a click-through, or any some other agreed to measure of reservation performance) is counted in favor of the publisher if the error is attributed to the advertiser; likewise, the performance measure is counted in favor of the advertiser if the error is attributed to the publisher. In some implementations, a performance measure is not counted if the error cannot be attributed to either the publisher or the advertiser. In other implementations, a performance measure is counted to both the publisher and the advertiser if the error cannot be attributed to either the publisher or the advertiser.

§5.3 Negotiated Risk and Reservation Expiration

In some implementations, the publisher and advertiser can negotiate performance reconciliation criteria and provide the agreed to performance reconciliation criteria to the reservation system 103. Such reconciliation criteria can be predefined by the reservation system 103, e.g., the advertiser (or publisher) assumes all risk, and all discrepancies are resolved in favor or the other party; or risk is assumed equally and discrepancies are resolved in favor the party not at fault. Reconciliation is then done according to the reconciliation criteria.

In some implementations, the reservation system 130 can determine a reservation expires when a common advertisement performance measure (e.g., reconciled impressions) reaches a performance count (e.g., the number of purchased impressions). In other implementations, the reservation system 130 can determine a reservation expires when an unrecognized advertisement performance measure of either the advertiser or the publisher reaches the performance count. Thereafter, the reservation system 130 can reconcile the performance measures between the advertiser and the publisher for a final accounting.

In some implementations, the reservation system 130 can facilitate reservation payments between the advertiser 102 and the publisher 106. The reservation system 130 can determine the final reservation price based on the reconciled performance and the reservation data. For example, if an advertiser 102 realized 10,000 reconciled impressions in a placement that has a reservation price of $0.10/impression, the final price for the reservation would be $1000 (e.g., 10,000 impressions*$0.10/impression). In turn, the reservation system 130 can debit an account belonging to the advertiser 102 and credit an account belonging to the publisher 106 in the amount of $1,000. Upon completion of the debit of the advertiser's account and corresponding credit to the publisher's account, the reservation transaction can be considered complete.

While reservation payments are described as occurring after the reservation period, in some implementations, the advertiser 102 and the publisher 106 can complete the payment transaction at the time that the reservation is created based on an estimated performance. For example, if a placement having the reservation data of publisher B in Table 2 is reserved for a week, the advertiser can be charged $10,000 at the time of purchase of the reservation (i.e., 1,000,000 impressions*$0.01/impression). This charge can be a final charge, or can be subject to credit or further debit based on a reconciliation after expiration of the reservation.

§6.0 Example Process Flows

Figure 3:
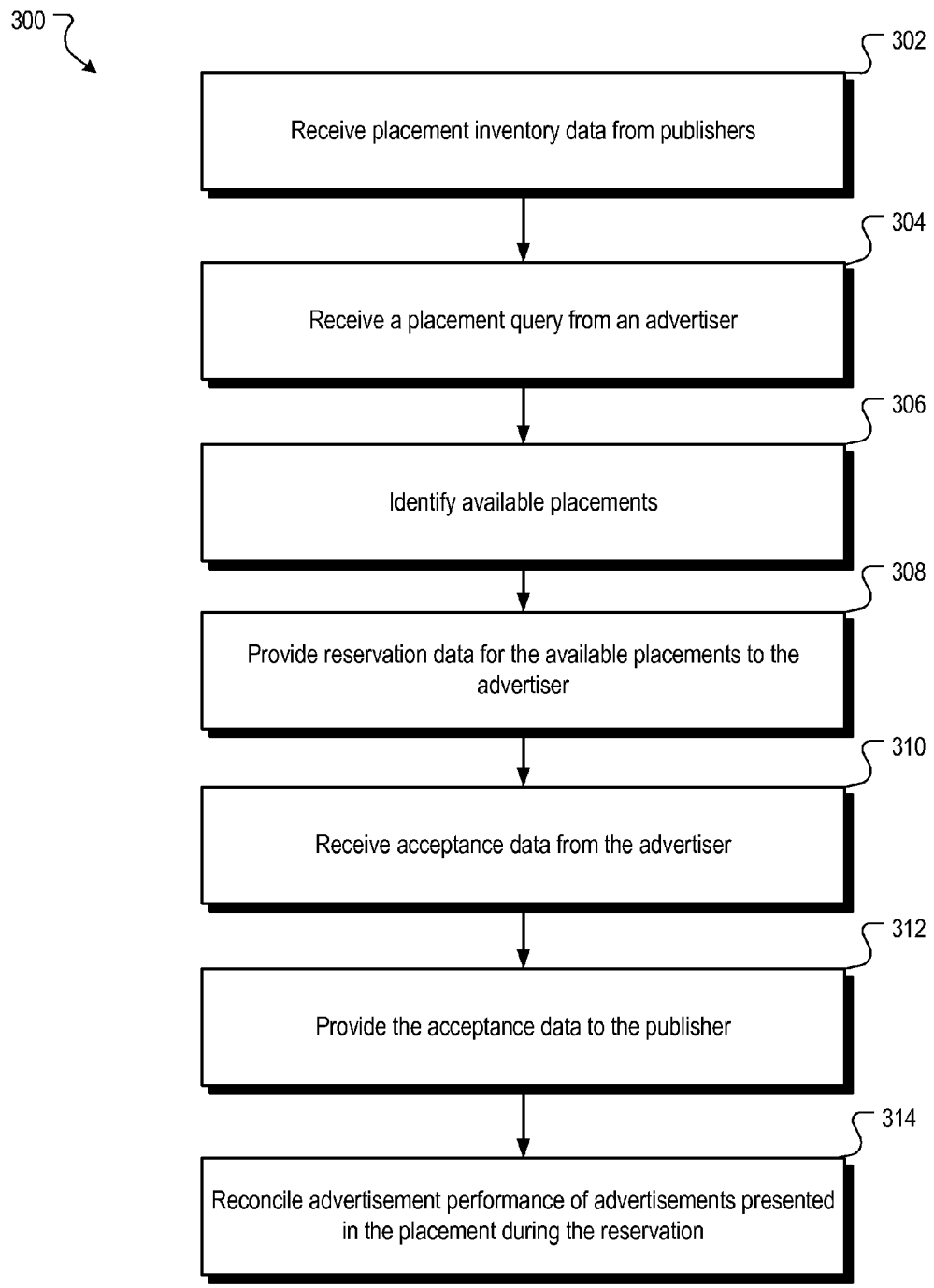
FIG. 3 is a flow chart of an example process of reserving items.

FIG. 3 is a flow chart of an example process 300 of reserving items. The process 300 can, for example, be implemented by the reservation subsystem 130 of FIG. 1.

Placement inventory data is received from publishers (302). In some implementations, the placement inventory data defines placements that the publishers are offering for reservation through an online reservation system. For example, the placement inventory data can provide information that identifies the content of the web page on which the placement is presented as well as the geographic reach of the placement, demographics of users that are reached by the placement, and other characteristics that define the placement. The placement inventory data can be received, for example, by the reservation system 130.

A placement query is received from an advertiser (304). In some implementations, the placement query includes targeting criteria that defines target placements for the advertiser. For example, the placement query can define a target placement based on the content of the web page on which the placement is presented, as well as the geographic reach of the placement, demographics of users that are reached by the placement, and other characteristics that define the placement. The placement query can be received, for example, by the reservation system 130.

Available placements are identified (306). In some implementations, the available placements are the target placements that satisfy the placement query and are available for reservation. In some implementations, the available placements can be identified by querying the publishers that provided placement inventory data that satisfies the placement query. Available placements can be identified, for example, by the reservation system 130.

Reservation data is provided to the advertiser for the available placements (308). In some implementations, the reservation data defines reservation requirements for each available placement. For example, the reservation data can include the price of the reservation, a start time and duration of the reservation, and other information pertinent to the reservation (e.g., terms and conditions). The reservation data can be provided to the advertiser, for example, by the reservation system 130.

Acceptance data is received from the advertiser (310). In some implementations, the acceptance data identifies the accepted placement from among the available placements and specifies that the advertiser has purchased the reservation. For example, an advertiser can select an accepted placement from a list of available placements. In turn, acceptance data can be generated based on the selection. The acceptance data can be received, for example, by the reservation system 130.

Acceptance data is provided to the publisher (312). The acceptance data can be provided to the publisher, for example, by the reservation subsystem 130. In some implementations, a charge to the advertiser can be incurred upon acceptance by the publisher. In other implementations, a charge can be incurred to the advertiser upon the advertiser selecting a reservation. In still other implementations, the charge can be adjusted, or can be incurred at a later time subject to the reconciliation (314).

Advertisement performance for advertisements presented in the placement during the reservation is reconciled (314). In some implementations, the reconciliation provides a common advertisement performance between the publisher of the accepted placement and the advertiser. For example, the reconciliation can identify a discrepancy between the performance measurements reported by the advertiser and the publisher. In turn, the reconciliation can determine whether the advertisement performance should be included in the final performance measurement. The reconciliation can be performed, for example, by the reservation system 130.

Figure 4:
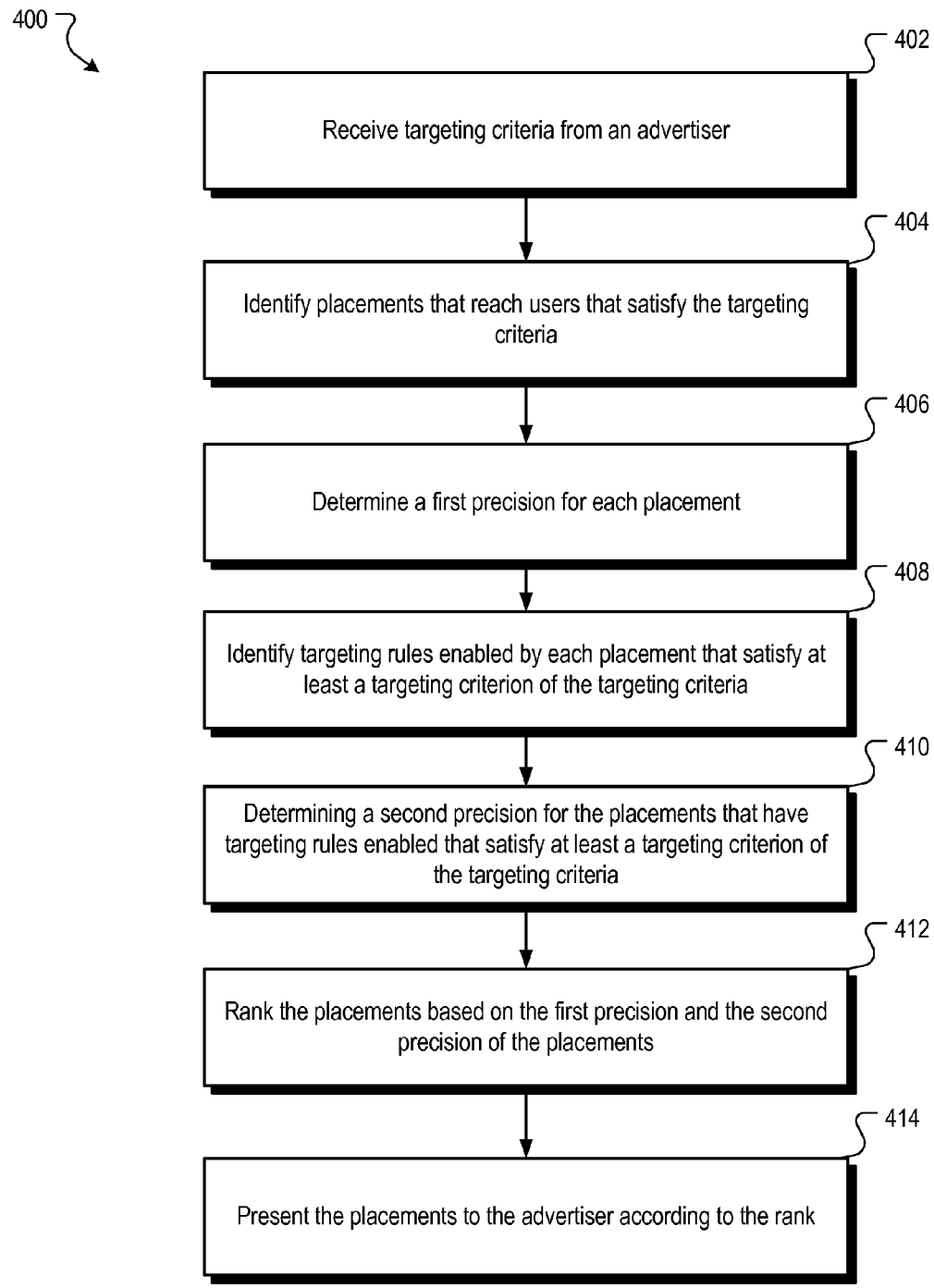
FIG. 4 is a flow chart of an example process of ranking available items.

FIG. 4 is a flow chart of an example process 400 of ranking available items. The process can be implemented, for example, by the reservation system 130 of FIG. 1.

Targeting criteria is received from an advertiser (402). In some implementations, the targeting criteria can define a target audience for an advertisement. For example, the targeting criteria received from the advertiser can define a target audience as an audience of men between the ages 18-25 that live in Florida. The targeting criteria can be received, for example, by the reservation system 130.

Placements that reach users that satisfy the targeting criteria are identified (404). In some implementations, the placements that reach users that satisfy the targeting criteria can be identified based on placement inventory received from publishers. For example, each publisher that is associated with placements that satisfy at least one of the targeting criteria can be requested to provide reservation data for available placements. The placements can be identified, for example, by the reservation system 130.

A first precision is determined for each placement (406). In some implementations, the first precision is based on a first number of the users that are reached by advertisements on the placement. For example, the first precision can be a ratio of the targeted users reached by each placement relative to the total number of users reached by each placement. The first precision can be determined, for example, by the reservation system 130.

Targeting rules enabled for the placement that satisfy at least a targeting criterion of the targeting criteria are identified (408). In some implementations, enabled targeting rules can be identified, for example, based on information included in the placement inventory data that are received from the publishers. The enabled targeting rules can be identified, for example by the reservation system 130.

A second precision is determined for the placement (410). In some implementations, the second precision is based a second number of users that are reached by an advertisement on the placement with the targeting rules enabled. For example, the second precision can be a ratio of the second number of targeted users reached by an advertisement on the placement relative to the second number of total users reached by the placement. The second precision can be determined, for example, by the reservation system 130.

The placements are ranked based on the first precision and second precision of the placements (412). In some implementations, placements that do not have targeting rules enabled can be ranked based on the first precision. In some implementations, placements that do have targeting rules enabled can be ranked based on the greater of the first precision and the second precision. The placement having the highest first and second precision can be ranked highest, with the other placements being ranked in descending order according to their first and second precisions. The placements can be ranked, for example, by the reservation system 130.

The placements are presented to the advertiser according to the rank (414). In some implementations, a graphical user interface including the placements can be provided to the advertiser. The placements can be presented, for example, by the reservation system 130.

Figure 5:
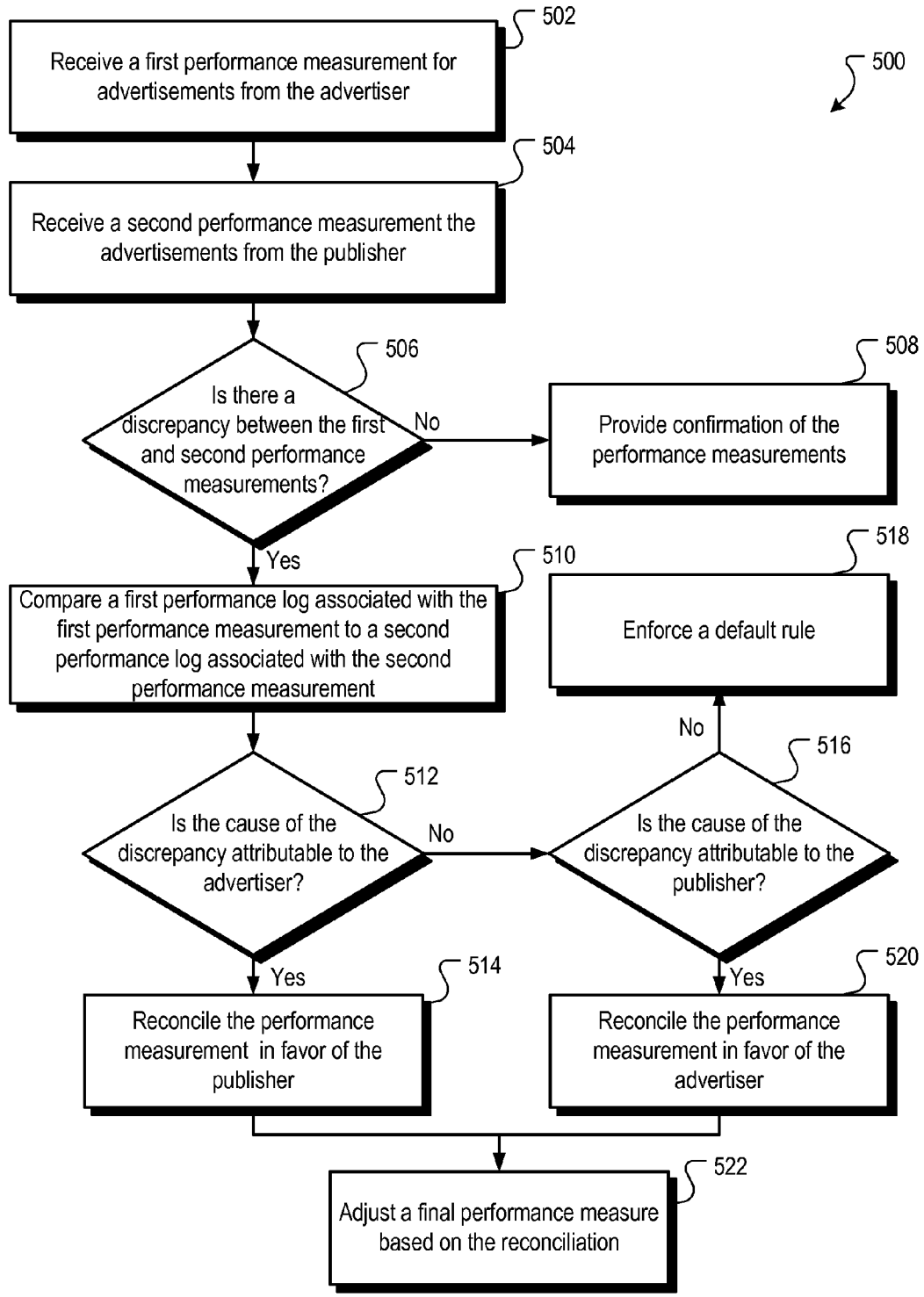
FIG. 5 is a flow chart of an example process of reconciling advertisement performance.

FIG. 5 is a flow chart of an example process 500 of reconciling advertisement performance. The process 500 can be implemented, for example, by the reservation system 130.

A first performance measurement for advertisements is received from the advertiser (502). In some implementations, the first performance measurement identifies a first measure of advertisement performance of advertisements, e.g., advertisements belonging to a campaign, during the reservation period. For example, the first performance measurement can be the number of impressions that the advertiser counted for the advertisements during the reservation. The first performance measurement can be received, for example, by the reservation system 130 in response to requesting log data from the advertiser 102, or as a result of monitoring traffic to and from the advertiser 102.

A second performance measurement for the advertisements is received from the publisher (504). In some implementations, the second performance measurement identifies a second measure of advertisement performance during the reservation period. For example, the second performance measurement can be the number of impressions that the publisher counted for the advertisements during the reservation. The second performance measurement can be received, for example, by the reservation system 130 in response to requesting log data from the publisher 106 or as a result of monitoring traffic to and from the publisher 106.

A determination whether a discrepancy exists between the first performance measurement and the second performance measurement is performed (506). The discrepancy can be, for example, a difference in the total number of impressions measured by the first and second performance measurements. The determination can be performed, for example, by the reservation system 130.

When there is not a discrepancy between the first and second performance measurements, a confirmation of the performance measurements is provided (508). In some implementations, the confirmation can be provided to the advertiser and the publisher. The confirmation can be provided, for example, by the reservation system 130.

When a discrepancy exists between the first and second performance measurements, a first performance log associated with the first performance measurement is compared to a second performance log associated with the second performance measurement (510). In some implementations, the comparison can be performed to identify the discrepancy between the first and second performance measurement. For example, the comparison can identify activity (e.g., advertisement request, serving an advertisement, etc.) that resulted in an impression count. The comparison can be performed, for example, by the reservation system 130.

A determination whether the cause of the discrepancy is attributable to the advertiser is performed (512). For example, if the advertiser provided a faulty link to the location of the advertisements, or the advertiser server was temporarily unavailable the cause of the discrepancy can be attributed to the advertiser. The determination can be performed, for example, by the reservation system 130.

When the cause of the discrepancy is attributable to the advertiser, the performance measurement is reconciled in favor of the publisher (514). For example, if the advertiser failed to provide a working link to the location of the advertisements, the impression can be counted based on the publisher's impression count for the impression. The reconciliation can be performed, for example, by the reservation system 130.

When the cause of the discrepancy is not attributable to the advertiser, a determination whether the cause of the discrepancy is attributable to the publisher is performed (516). For example, if a publisher server or communication failure prevented the advertisements from being presented, the cause of the discrepancy can be attributed to the publisher.

When the cause of the discrepancy is not attributable to the advertiser or the publisher, a default rule is enforced (518). The default rule can reconcile discrepancies that are not attributable to the advertiser or the publisher based on a default allocation. For example, the default allocation can reconcile the discrepancies equally among the advertiser and the publisher. Alternatively, the default allocation can reconcile the discrepancies in favor of the advertiser. The default rule can be enforced, for example, by the reservation system 130.

When the cause of the discrepancy is attributable to the publisher, the performance measurement is reconciled in favor of the advertiser (520). For example, if the publisher failed to access the correct link for the advertisements, the impression can be ignored based on the advertiser's impression count. The reconciliation can be performed, for example, by the reservation system 130.

A discrepancy can occur that can be partially attributable to both the publisher and the advertiser. Therefore, while not shown in FIG. 5, the process 500 can perform both a publisher fault check and an advertiser fault check to determine if the discrepancy is duet to both publisher and advertiser errors. Based on the outcome of this publisher check, the process can then reconcile the discrepancy.

A final performance measurement is adjusted based on the reconciliation (522). In some implementations, the final performance measurement can be initiated with a performance measurement equal to the lower of the first and second performance measurements. In turn, the final performance measurement can be incremented or maintained based on the reconciliation. The final performance measurement can be adjusted, for example, by the reservation system 130.

Figure 6:
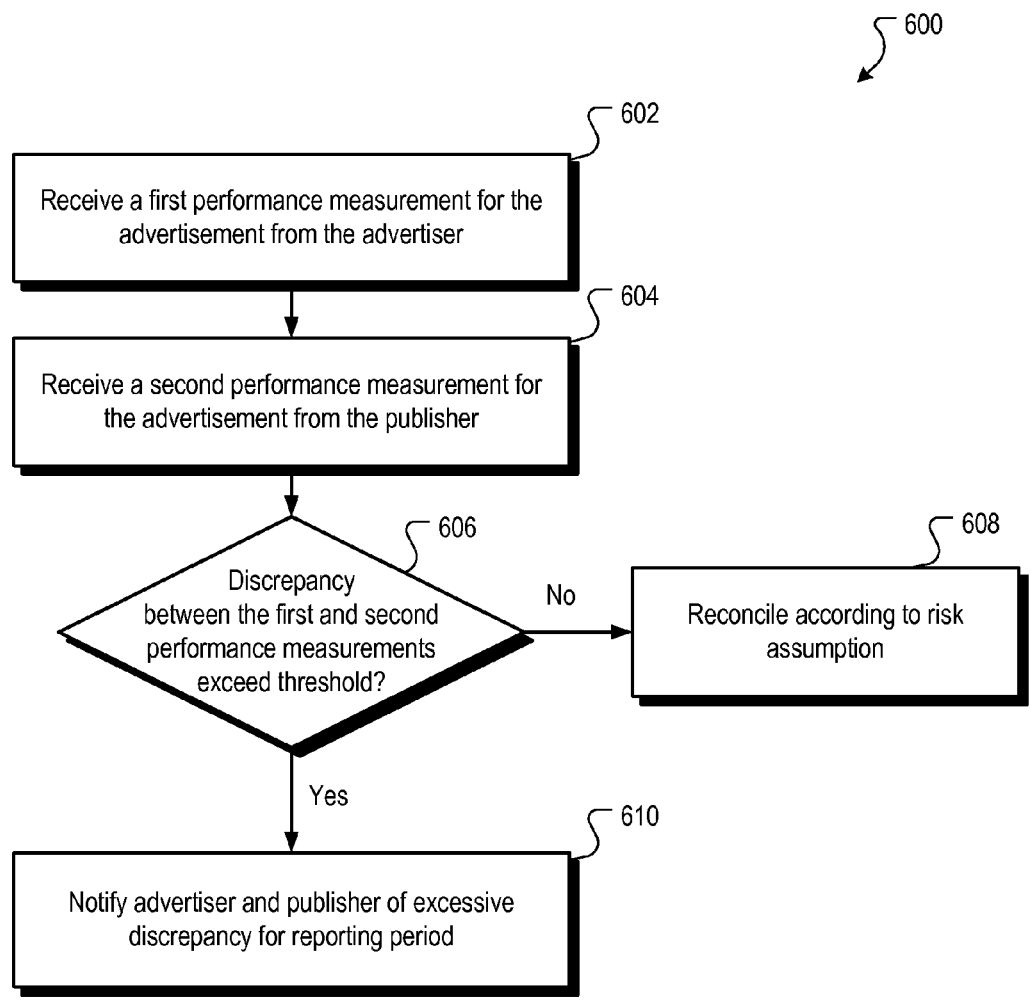
FIG. 6 is a flow chart of another example process of reconciling advertisement performance.

FIG. 6 is a flow chart of another example process of reconciling advertisement performance. The process 600 can be implemented, for example, by the reservation system 130.

A first performance measurement for advertisements is received from the advertiser (602). In some implementations, the first performance measurement identifies a first measure of advertisement performance of advertisements, e.g., advertisements belonging to a campaign, during the reservation period. For example, the first performance measurement can be the number of impressions that the advertiser counted for the advertisements during the reservation.

A second performance measurement for the advertisements is received from the publisher (604). In some implementations, the second performance measurement identifies a second measure of advertisement performance during the reservation period. For example, the second performance measurement can be the number of impressions that the publisher counted for the advertisements during the reservation.

A determination whether a discrepancy between the first and second performance measurements exceeds a threshold is made (606). In some implementations, the difference between the first performance measure and the second performance measure is compared to a risk threshold, e.g., 5%. The risk threshold can be for an overall reservation period, or for the reported portion of the reservation period.

When the discrepancy does not exceed the risk threshold, then a reconciliation according to a risk assumption is made (608). For example, a publisher may have agreed to assume the risk of discrepancy within the risk threshold, and thus the advertiser is charge based only on the first performance measure.

When the discrepancy does exceed the risk threshold, then the advertiser and publisher are notified of the excessive discrepancy that was detected during the reporting period (610). For example, the reservation system 130 can send an e-mail notification to both the advertiser and the publisher notifying each party of the excessive discrepancy.

§7.0 Example Computer System

Figure 7:
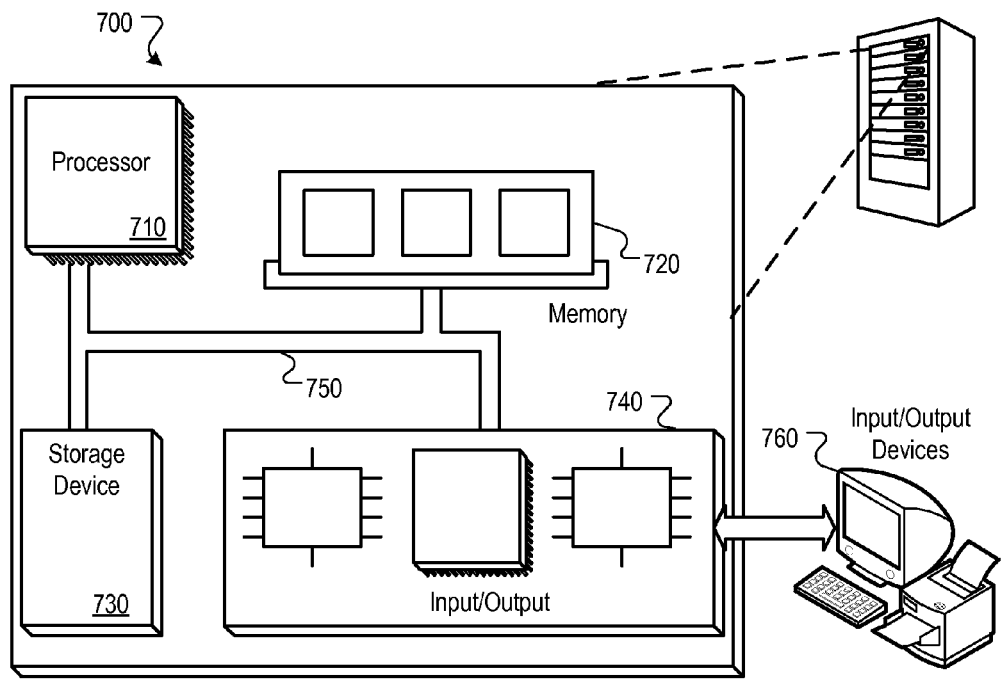
FIG. 7 is a block diagram of an example computer system.

FIG. 7 is block diagram of an example computer system 700. The system 700 can be used to implement the reservation system 130 singularly, or can be one of many computers in a server farm that is used to implement the reservation system 130. The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can, for example, include a hard disk device, an optical disk device, or some other large capacity storage device.

The input/output device 740 provides input/output operations for the system 700. In one implementation, the input/output device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 760. Other implementations, however, can also be used, such as mobile computing devices, mobile communication devices, set-top box television client devices, etc.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
receiving, by a reservation system comprising one or more computers and from an advertiser, a first performance measurement that was tracked by the advertiser for advertisements presented in a placement of a publisher and that was reserved by the advertiser, the first performance measurement identifying a first measure of advertisement performance during a reservation period;
receiving, by the reservation system and from the publisher, a second performance measurement that was tracked by the publisher for the advertisements of the advertiser presented in the placement reserved by the advertiser, the second performance measurement identifying a second measure of advertisement performance during the reservation period;
identifying, by the reservation system, a discrepancy between the first performance measurement and the second performance measurement; and
reconciling, by the reservation system, the discrepancy.

27

2. The method of claim 1, wherein reconciling the discrepancy comprises:
    comparing a first performance log associated with the first performance measurement to a second performance log associated with the second performance measurement to determine a cause of the discrepancy; and
    reconciling the discrepancy based on the cause of the discrepancy.

3. The method of claim 2, wherein reconciling the discrepancy based on the cause of the discrepancy comprises:
    reconciling in favor of the advertiser when the cause of the discrepancy is attributable to the publisher;
    reconciling in favor of the publisher when the cause of the discrepancy is attributable to the advertiser; and
    generating a common advertisement performance measure based on the determinations.

4. The method of claim 1, wherein the placements comprise online advertisement slots maintained by the publishers.

5. The method of claim 1, wherein reconciling the discrepancy comprises:
    determining if the discrepancy exceeds a risk threshold; and
    reconciling the discrepancy according to a risk of loss that is attributed to one of the publisher or the advertiser if the discrepancy does not exceed the risk threshold.

6. The method of claim 5, further comprising notifying the publisher and the advertiser of the discrepancy exceeding the risk threshold if the discrepancy does exceed the risk threshold.

7. A system, comprising:
    a data processing apparatus; and
    a data store storing instructions that, when executed by the data processing apparatus, cause the data processing apparatus to perform operations comprising:
        receiving, from an advertiser, a first performance measurement that was tracked by the advertiser for advertisements presented in a placement of a publisher and that was reserved by the advertiser, the first performance measurement identifying a first measure of advertisement performance during a reservation period;
        receiving, from the publisher, a second performance measurement that was tracked by the publisher for the advertisements of the advertiser presented in the placement reserved by the advertiser, the second performance measurement identifying a second measure of advertisement performance during the reservation period;
        identifying a discrepancy between the first performance measurement and the second performance measurement; and
        reconciling the discrepancy.

8. The system of claim 7, wherein reconciling the discrepancy comprises:
    comparing a first performance log associated with the first performance measurement to a second performance log associated with the second performance measurement to determine a cause of the discrepancy; and
    reconciling the discrepancy based on the cause of the discrepancy.

9. The system of claim 8, wherein reconciling the discrepancy based on the cause of the discrepancy comprises:
    reconciling in favor of the advertiser when the cause of the discrepancy is attributable to the publisher;
    reconciling in favor of the publisher when the cause of the discrepancy is attributable to the advertiser; and
    generating a common advertisement performance measure based on the determinations.

10. The system of claim 7, wherein reconciling the discrepancy comprises:
    determining if the discrepancy exceeds a risk threshold;
    reconciling the discrepancy according to a risk of loss that is attributed to one of the publisher or the advertiser if the discrepancy does not exceed the risk threshold.

11. The system of claim 10, wherein reconciling the discrepancy further comprises notifying the publisher and the advertiser of the discrepancy exceeding the risk threshold if the discrepancy does exceed the risk threshold.

12. The system of claim 7, wherein the placements comprise online advertisement slots maintained by the publishers.

13. A computer-readable medium comprising instructions that, when executed by a data processing apparatus, perform operations comprising:
    receiving, from an advertiser, a first performance measurement that was tracked by the advertiser for advertisements presented in a placement of a publisher and that was reserved by the advertiser, the first performance measurement identifying a first measure of advertisement performance during a reservation period;
    receiving, from the publisher, a second performance measurement that was tracked by the publisher for the advertisements of the advertiser presented in the placement reserved by the advertiser, the second performance measurement identifying a second measure of advertisement performance during the reservation period;
    identifying a discrepancy between the first performance measurement and the second performance measurement; and
    reconciling the discrepancy.

14. The computer-readable medium of claim 13, wherein reconciling the discrepancy comprises:
    comparing a first performance log associated with the first performance measurement to a second performance log associated with the second performance measurement to determine a cause of the discrepancy; and
    reconciling the discrepancy based on the cause of the discrepancy.

15. The computer-readable medium of claim 14, wherein reconciling the discrepancy based on the cause of the discrepancy comprises:
    reconciling in favor of the advertiser when the cause of the discrepancy is attributable to the publisher;
    reconciling in favor of the publisher when the cause of the discrepancy is attributable to the advertiser; and
    generating a common advertisement performance measure based on the determinations.

16. The computer-readable medium of claim 13, wherein reconciling the discrepancy comprises:
    determining if the discrepancy exceeds a risk threshold;
    reconciling the discrepancy according to a risk of loss that is attributed to one of the publisher or the advertiser if the discrepancy does not exceed the risk threshold.

17. The computer-readable medium of claim 16, wherein reconciling the discrepancy further comprises notifying the publisher and the advertiser of the discrepancy exceeding the risk threshold if the discrepancy does exceed the risk threshold.

18. The computer-readable medium of claim 13, wherein the placements comprise online advertisement slots maintained by the publishers.

* * * * *